United States Patent [19]
Yamauchi et al.

[11] 3,953,363
[45] Apr. 27, 1976

[54] CATALYST FOR PURIFYING EXHAUST GASES

[75] Inventors: Shin Yamauchi, Ikeda; Koshi Horie, Suita; Tetsuji Ono, Amagasaki; Takashi Ohara, Nishinomiya, all of Japan

[73] Assignee: Nippen Shokubai Kogaku Kogyo Co. Ltd., Osaka, Japan

[22] Filed: Feb. 11, 1974

[21] Appl. No.: 441,627

[30] Foreign Application Priority Data
Feb. 14, 1973   Japan................................ 48-17415

[52] U.S. Cl............................. 252/443; 252/455 R; 252/466 B; 252/474; 423/213.5
[51] Int. Cl.²..................... B01J 23/46; B01J 23/72; B01J 23/74
[58] Field of Search................ 252/474, 466 B, 443, 252/455 R; 423/213.2, 213.5

[56] References Cited
UNITED STATES PATENTS

| | | | |
|---|---|---|---|
| 3,257,163 | 6/1966 | Stiles............................... | 423/213.2 |
| 3,699,683 | 10/1972 | Tourtellotte et al.............. | 423/213.2 |
| 3,702,236 | 11/1972 | Fessler............................. | 423/213.2 |
| 3,719,739 | 3/1973 | Thompson....................... | 252/472 X |
| 3,729,936 | 5/1973 | De Palma et al................ | 423/213.2 |
| 3,784,675 | 1/1974 | Kobyunski et al............... | 423/213.5 |
| 3,816,594 | 6/1974 | Kobylinski et al............... | 423/213.5 |

*Primary Examiner*—W. J. Shine
*Attorney, Agent, or Firm*—Sherman & Shalloway

[57] ABSTRACT

A catalyst for removing nitrogen oxides, carbon monoxide, and hydrocarbons in exhaust gases, said catalyst being prepared by supporting copper and nickel on a carrier and then further supporting at least two components selected from the group consisting of iridium, rhodium and ruthenium, the atomic weight ratio of copper to nickel being 0.2 to 5, the atomic weight ratio of the sum of copper and nickel to the sum of at least two components selected from the group consisting of iridium, rhodium and ruthenium being 10 to 100,000, and the total weight of copper and nickel being 10 to 200 g per liter of the catalyst.

9 Claims, No Drawings

CATALYST FOR PURIFYING EXHAUST GASES

This invention relates to a catalyst for removing noxious components in exhaust gases, and more specifically, to a catalyst for use in purifying automobile exhaust gases by removing nitrogen oxides, carbon monoxide and hydrocarbons therefrom.

With the development of air-conditioning and motorization in recent years, air pollution caused by exhaust gases from boilers and engines has posed a serious problem particularly in the urban areas. Carbon monoxide (CO), hydrocarbons (HC) and nitrogen oxides ($NO_x$) contained in the exhaust gases constitute a major cause of atmospheric pollution, and the removal of these noxious components to a maximum extend before release into the atmosphere is an important measure for solving this problem.

Various catalysts for removing these noxious components catalytically have been previously proposed with a view to removing, and reducing the contents of, these noxious components. In particular, catalysts for removing CO and HC have been developed almost to an extent of commercial acceptance. However, conventional catalysts for removing $NO_x$ still have much to be desired, mainly because they cause the formation of a great quantity of by-product ammonia ($NH_3$) or have a short active lifetime; and these catalysts have not yet come into commercial use.

Methods have also been known to remove $NO_x$ by using a catalyst composed of a noble metal element. For example, it has already been recognized that iridium (Ir), rhodium (Rh) or ruthenium (Ru) gives rise to better results than platinum (Pt) or palladium (Pd) does, and Ru acts effectively on $NO_x$ even at low temperatures. However, Ru has the defect of being extremely sublimable when used in oxidative atmosphere; and Rh and Ir are two of the most expensive noble metals, and their resources are limited. It has been one of the important problems, therefore, to establish a method of using these noble metals effectively.

Catalysts composed mainly of an oxide of Cu and an oxide of Ni have also been known as catalysts for removing $NO_x$. These catalysts yield a decreased amount of by-product $NH_3$, and have good durability. Their activity on $NO_x$ is superior at a temperature of at least 600°C., but is not entirely satisfactory at a temperature below 500°C.

Accordingly, it is an object of this invention to provide a catalyst for cleaning exhaust gases, which is free from the various defects of the conventional catalysts described above.

We have found that the object of this invention can be achieved by using certain catalysts prepared by supporting Cu and Ni on a carrier, and then further supporting at least two components selected from the group consisting or Ir, Rh and Ru, that is, (1) Ir and Rh, (2) Ir and Ru, (3) Rh and Ru, or (4) Ir, Rh and Ru.

Stated in detail, the catalyst of this invention is characterized by the fact that the atomic ratio of Cu to Ni is 0.2 to 5, preferably 0.3 to 3, the atomic ratio of the sum of copper and nickel to the sum of at least two components selected from Ir, Rh and Ru is 10 to 100,000, preferably 100 to 10,000, and the total weight of Cu and Ni is 10 to 200 g, preferably 20 to 100 g, per liter of the catalyst. It has been found in the present invention that when the total amount of Ir and Rh supported is as low as 0.001 to 1.0 g, preferably 0.01 to 0.5 g, per liter of catalyst, a high $NO_x$ purifying ability comparable to that heretofore attained by Ru can be achieved, and the resulting catalyst is of utmost practical value.

The catalyst of this invention is prepared, for example, by the following procedure.

First, a catalyst substance containing Cu and Ni as metal components is prepared by adding a carrier to a mixed aqueous solution of a water-soluble salt of Cu and a water-soluble salt of Ni in predetermined amounts, concentrating the solution to dryness, and then calcining the dried mixture; or impregnating the carrier with the aqueous solution, drying the mixture, and calcining it. The calcination is carried out for several hours in the atmospheric air at 300 to 700°C. Then, the resulting catalyst substance containing Cu and Ni is immersed in an aqueous solution containing two or three of Ir, Rh and Ru to support these noble metal components on the catalyst substance. These noble metals may be supported on the catalyst substance simultaneously from a mixed solution, or separately from each other. The supporting of the noble metals can be effected by withdrawing the carrier after immersion and then drying it; or evaporating the solution to dryness while the carrier is being immersed therein. After the supporting of these noble metal components, the supported composition is dried, and then subjected to a reducing treatment. Reduction is performed, for example, by heating the composition for several hours at a temperature of 300 to 600°C. in a stream of hydrogen or in a nitrogen stream containing hydrogen. The reducing treatment may also be carried out using formaldehyde or hydrazine instead of the hydrogen gas.

Alumina is preferred as a carrier for use in preparing the catalyst of this invention. However, alumina containing a very tiny amount of silica, lithium, calcium, magnesium, thorium, zirconium, hafnium, boron, etc. may also be used if it has sufficient strength with little attrition loss. The shape of the carrier may either be a sphere, a cylinder, or an indefinite shape. Monolithic structures of a honeycomb, corrugated or square shaped cell composed of alumina, mullite, cordierite, or silicon carbide can also be used as the carrier. It is obvious that even if a metallic ribbon or metallic gauze is used as a carrier, the exhaust gas cleaning ability of the catalyst of this invention can be fully exhibited.

The catalyst of this invention is of low cost because of relatively small amounts of noble metals used, and have very superior activity and a long active lifetime for use in purifying a wide range of exhaust gases, such as those from automobiles, industrial plants, and boilers. It is especially superior in activity, active lifetime, and durability as a catalyst for purifying exhaust gases from internal combustion engines.

The catalyst of this invention is especially effective as a catalyst for cleaning $NO_x$ in exhaust gases, and exhibits high activity for reducing $NO_x$ to non-poisonous nitrogen gas. Furthermore, the catalyst of this invention has an action of completely oxidizing HC or CO when placed in exhaust gases in an oxidizing atmosphere. Accordingly, when the catalyst of this invention is used for purifying exhaust gases from internal combustion engines, not only does it act as an oxidizing catalyst at the time of cold starting, but also it is possible to remove $NO_x$, CO and HC simultaneously when the engine is operated at the narrow air-fuel ratio (A/F) region including stoichiometric point, namely 14.3 to 14.7.

The following Examples illustrate the present invention without any intention of limiting the invention thereby.

EXAMPLE 1

12.40 g of nickel nitrate [$Ni(NO_3)_2·6H_2O$] and 9.55 g of cupric nitrate [$Cu(NO_3)_2·3H_2O$] were dissolved in 50 cc of water, and the solution was thoroughly mixed with 100 cc of spherical active alumina particles having an average particle size of 3 mm. The mixture was concentrated to dryness, and then calcined in a stream of air at 550°C. for 3 hours to form a Cu-Ni supported composition. Then, 0.0106 g of hexachloroiridic acid ($H_2IrCl_6$) and 0.0128 g of rhodium trichloride ($RhCl_3·3H_2O$) were dissolved in water to form 50 cc of an aqueous solution. The aqueous solution was mixed with the above Cu-Ni supported composition, and the mixture was concentrated to dryness. After drying, the mixture was reductively calcined for 3 hours at 500°C. in a stream of hydrogen.

The amounts of the catalyst components supported after calcination were 25 g for Cu, 25 g for Ni, 0.05 g for Ir, and 0.05 g for Rh, all calculated as metal components based on 1 liter of the catalyst.

EXAMPLE 2

A catalyst was prepared in the same way as in Example 1 except that ruthenium trichloride ($RuCl_3.H_2O$) was used in an amount of 0.0112 g instead of the rhodium trichloride.

The amounts of the catalyst components supported in the resulting catalyst were 25 g for Cu, 25 g for Ni, 0.05 g for Ir, and 0.05 g for Ru, based on the metal components per liter of the catalyst.

EXAMPLE 3

A catalyst was prepared in the same way as in Example 1 except that as the noble metals, 0.0106 g of $H_2IrCl_6$, 0.0128 g of $RhCl_3.3H_2O$, and 0.0112 g of $RuCl_3. H_2O$ were used.

The amounts of the catalyst components supported in the resulting catalyst were 25 g for Cu, 25 g for Ni, 0.05 g for Ir, 0.50 g for Ru and 0.05 g for Rh, based on the metal components per liter of the catalyst.

EXAMPLE 1

A Cu-free catalyst was prepared by dissolving 24.8 g of $Ni(NO_3)_2.6H_2O$ in 50 cc of water, adding 100 cc of the same alumina carrier as used in Example 1, concentrating the mixture to dryness, and calcining the mixture for 3 hours at 550°C. in a stream of air. 0.0106 g of $H_2IrCl_6$ and 0.0128 g of $RhCl_3.3H_2O$ were supported on the resulting supported catalyst composition in the same way as in Example 1, followed by reductive calcination.

The amounts of the catalyst components after calcination were 50 g, 0.05 g, and 0.05 g respectively for Ni, Ir, and Rh per liter of the catalyst.

COMPARATIVE EXAMPLE 2

A catalyst containing Ir and Ru as the noble metal components and being free from Ni was prepared in accordance with the procedure described in Example 1. The amounts of the catalyst components supported were 50 g, 0.05 g, and 0.05 g respectively for Cu, Ir, and Ru per liter of the catalyst.

COMPARATIVE EXAMPLE 3

A catalyst containing a larger amount of a Cu component than an Ni component was prepared in accordance with the procedure of Example 1. The amounts of Cu, Ni, Ir and Rh supported per liter of the catalyst were 50 g, 5 g, 0.05 g, and 0.05 g, respectively.

COMPARATIVE EXAMPLE 4

A catalyst containing a larger amount of an Ni component than a Cu component was prepared in accordance with the procedure of Example 1. As the noble metal component, 0.0112 g of $RuCl_2. H_2O$ was used instead of 0.0106 g of $H_2IrCl_6$. The amounts of Cu, Ni, Rh and Ru supported per liter of the catalyst were 5 g, 50 g, 0.05 g, and 0.05 g, respectively.

COMPARATIVE EXAMPLE 5

A catalyst containing Cu, Ni and Ru was prepared in accordance with the process described in Example 1. The amounts of Cu, Ni and Ru supported per liter of the catalyst were 10 g, 30 g, and 0.5 g, respectively.

EXAMPLE 4

5 cc of each of the catalysts obtained in Examples 1 to 3 and Comparative Examples 1 to 5 was packed in a stainless steel flow reaction tube having an inside diameter of 18 mm, and a gas having the following composition which resembled exhaust gases from an internal combustion engine was introduced through the tube. The efficiency of cleaning was measured.

The conversion of nitrogen oxides ($NO_x$) was measured by the following procedure at varying inlet temperatures caused by external heating. The outlet gas from the catalyst layer was passed over a platinum catalyst (active alumina carrier, Pt 1.0 g/l, the amount of catalyst 10 cc) held at 600°C. together with secondary air, and the by-product ammonia was completely oxidized to nitrogen oxide (NO). Then, the gas was analyzed to determine the NO content (not converted NO and formed NO from by-product $NH_3$). The amount of NO determined above was subtracted from the amount of inlet NO, thereby obtaining the conversion of $NO_x$.

The conversions of CO and HC were measured on 5 cc of the catalyst obtained in Example 1. In other words, the conversions were obtained by analyzing the inlet gas and the outlet gas.

These conversions are defined by the following equation.

$$NO_x \text{ conversion}(\%) = \frac{(NO_x \text{ of inlet}) - (NO_x \text{ of outlet}) - (NO_x \text{ from } NH_3 \text{ formed})}{(NO_x \text{ of inlet})} \times 100$$

$$CO \text{ or } HC \text{ conversion}(\%) = \frac{(CO \text{ or } HC \text{ of inlet}) - (CO \text{ or } HC \text{ of outlet})}{(CO \text{ or } HC \text{ of inlet})} \times 100$$

The compositions of the feed gas and the reaction conditions are shown in Table 1 below.

Table 1

|  | For nitrogen oxides | For carbon monoxide or hydrocarbons |
|---|---|---|
| Carbon monoxide | 1 % | 1 % |
| Oxygen | 0.5 % | 5 % |

Table 1-continued

|  | For nitrogen oxides | For carbon monoxide or hydrocarbons |
|---|---|---|
| Propylene | 1,000 ppm | 500 ppm |
| Nitrogen oxide | 1,000 ppm | None |
| Hydrogen | 0.4 % | None |
| Water content | 10 % | 10 % |
| Nitrogen | remainder | remainder |
| Total amount of gas | 2.5 l/min. | 2.5 l/min. |
| Space velocity | 30,000 hr$^{-1}$ | 30,000 hr$^{-1}$ |
| Inlet temperature | 300 – 750°C | 200 – 300°C. |

The analyzing instruments used were an NDIR type (model AIA-II) for $NO_x$, an NDIR type (model MEX-A-200) for CO, and an FID type (model MEXA-F-I) for HC, all being the products of Horiba Seisakusho.

The conversions of the catalysts of Examples 1 to 3 and Comparative Examples 1 to 5 at various temperatures are shown in Table 2-1 and 2-2.

Table 2-1

|  | Catalyst composition(g/l) | | | | | $NO_x$ conversion(%) | | | |
|---|---|---|---|---|---|---|---|---|---|
|  | Cu | Ni | Ir | Rh | Ru | 300°C. | 450°C. | 600°C. | 750°C. |
| Example 1 | 25 | 25 | 0.05 | 0.05 | — | 82 | 92 | 94 | 95 |
| Example 2 | 25 | 25 | 0.05 | — | 0.05 | 88 | 93 | 95 | 94 |
| Example 3 | 25 | 25 | 0.05 | 0.05 | 0.05 | 89 | 94 | 94 | 96 |
| Comparative Example 1 | — | 50 | 0.05 | 0.05 | — | 38 | 75 | 88 | 92 |
| Comparative Example 2 | 50 | — | 0.05 | — | 0.05 | 51 | 82 | 80 | 80 |
| Comparative Example 3 | 50 | 5 | 0.05 | 0.05 | — | 53 | 82 | 82 | 83 |
| Comparative Example 4 | 5 | 50 | — | 0.05 | 0.05 | 42 | 81 | 87 | 89 |
| Comparative Example 5 | 10 | 30 | — | — | 0.5 | 67 | 88 | 83 | 82 |

Table 2-2

|  | Catalyst composition | 200°C. | 225°C. | 250°C. | 300°C. |
|---|---|---|---|---|---|
| CO conversion (%) | Catalyst of Example 1 | 76 | 97 | 100 | 100 |
| HC conversion (%) | " | 9 | 21 | 30 | 75 |
| CO conversion (%) | Catalyst of Example 2 | 70 | 92 | 98 | 100 |
| HC conversion (%) | " | 5 | 16 | 26 | 73 |
| CO conversion (%) | Catalyst of Example 3 | 83 | 98 | 100 | 100 |
| HC conversion (%) | " | 18 | 31 | 57 | 82 |

EXAMPLE 5

A catalyst as indicated in Table 3 was prepared in the same way as in Example 1 except that 0.00212 g of $H_2IrCl_6$ was used.

EXAMPLES 6 to 10

Catalysts were prepared in the same way as in Examples 1 to 3 with varying amounts of the components, and the cleaning activities of these catalysts were measured by the method described in Example 4. The conversions of $NO_x$ at various temperatures are shown in Table 3.

Table 3

| Examples | Catalyst composition(g/l) | | | | | $NO_x$ conversion(%) | | | |
|---|---|---|---|---|---|---|---|---|---|
|  | Cu | Ni | Ir | Rh | Ru | 300°C. | 450°C. | 600°C. | 750°C. |
| 5 | 25 | 25 | 0.02 | 0.2 | — | 84 | 93 | 93 | 95 |
| 6 | 25 | 25 | 0.2 | — | 0.02 | 83 | 92 | 93 | 93 |
| 7 | 50 | 50 | — | 0.02 | 0.05 | 81 | 92 | 95 | 94 |
| 8 | 10 | 10 | — | 0.05 | 0.05 | 78 | 87 | 94 | 93 |
| 9 | 10 | 30 | 0.01 | 0.01 | — | 71 | 84 | 90 | 92 |
| 10 | 30 | 10 | 0.05 | 0.05 | — | 85 | 92 | 92 | 94 |

As is clear from the results shown in Tables 2-1, 2-2 and 3, the catalysts of the Examples in accordance with this invention exhibit superior efficiencies of cleaning $NO_x$ over a wide temperature range. It is also seen that these catalysts have good activity on CO and HC at low temperatures. When the catalyst has only one of Cu and Ni components, and only one of the noble metals, it exhibits a considerably lower conversion than the catalyst of this invention does.

EXAMPLE 11

A thermal stability test was performed on the catalyst obtained in Example 1. When the activity test was performed on 5 cc of the catalyst which had been calcined in air for 24 hours at 1,000°C., the $NO_x$ conversions at 450°C., 600°C., and 750°C., were 60 %, 81 %, and 84 %, respectively.

COMPARATIVE EXAMPLE 6

The thermal stability test was performed on the catalyst of Comparative Example 5 in the same way as in Example 11. The conversions of $NO_x$ at 450°C., 600°C., and 750°C. were 41 %, 52 %, and 63 %, respectively.

EXAMPLE 12

A catalyst was prepared using a honeycomb-shaped carrier. A honeycomb-shaped structure composed of cordierite which had a cell density of 220 gas channels per square inch of cross section and an open frontal area of 74 % (the product of Corning Glass) was cut into a size of 30 mm diameter × 42.5 mm (apparent volume 30 cc). The structure was coated with 3.6 of -alumina, and then immersed in a mixed solution prepared by dissolving 95.5 g of $Cu(NO_3)_2.3H_2O$ and 124 g of $Ni(NO_3)_2.6H_2O$ in 25 cc of water to deposit Cu and Ni. Then, the catalyst composition was dried, and calcined. The resulting product was fully impregnated with 30 cc of and aqueous solution containing 0.00318 g of $H_2IrCl_6$ and 0.00384 g of $RhCl_3.3H_2O$, and after drying, was reductively calcined in a stream of hydrogen at 500°C. for 3 hours. The amounts of the catalyst components supported were 25 g, 25 g, 0.05 g, and 0.05 g respectively for Cu, Ni, Ir and Rh as metal components per liter of the catalyst.

The catalyst was packed in a stainless steel flow reaction tube having an inside diameter of 30 mm, and a gas of the composition shown in Table 1 was passed through the reaction tube at a rate of 15 l/min. The conversions of $NO_x$ at 300°C., 450°C., 600°C., and 750°C. were 79 %, 91 %, 95 %, and 95 %, respectively.

EXAMPLE 13

A durability test on a bench scale was performed on the pellet catalyst obtained in Example 1 and the honeycomb-shaped catalyst obtained in Example 12, using exhaust gases from an automobile.

30 cc of the pellet catalyst of Example 1 or one honeycomb-shaped catalyst (apparent volume 30 cc) of Example 12 was packed in a stainless steel flow reaction tube having an inside diameter of 30 mm, and by external heating, the catalyst layer was maintained at a temperature of 600°C. A Toyota 8R engine equipped with a dynamometer was operated in a steady state, and the exhaust gases obtained were introduced into the catalyst layer at a feed rate of 15 l/min. at a space velocity of 30.000 hr⁻¹. The gasoline used contained 0.03 g of lead per U.S. gallon. The exhaust gases were composed, on an average, of 0.6 % of CO, 0.5 % of $O_2$, 1500 ppm (calculated as methane) of HC, and 100 ppm of $NO_x$, and the average A/F ratio of the engine was 14.5. $NH_3$ contained in the gases from the outlet of the catalyst layer was collected with a 0.5 % aqueous solution of boric acid, and then determined by titration with 0.1N $H_2SO_4$. The analyzing instruments used were a chemical type (model MEXAC-1) for $NO_x$, an NDIR tupe (model MEXA-18) for CO, and an FID type (model MEXA-18) for HC, all being the products of Horiba Ltd., and for $O_2$ a magnetic type (OA-137) produced by Servomex Control Ltd.

The results of the durability test conducted for 200 hours are shown in Table 4. It is seen from Table 4 that the catalysts of this invention have superior durability.

Table 4

|  | Time (hours) | Catalyst of Example 1 | Catalyst of Example 12 |
|---|---|---|---|
| $NO_x$ conversion (%) | 0 | 93 | 95 |
|  | 50 | 91 | 94 |
|  | 100 | 92 | 92 |
|  | 150 | 89 | 90 |
|  | 200 | 87 | 88 |
| CO conversion (%) | 0 | 93 | 94 |
|  | 50 | 92 | 93 |
|  | 100 | 90 | 92 |
|  | 150 | 89 | 90 |
|  | 200 | 88 | 89 |
| HC conversion (%) | 0 | 79 | 81 |
|  | 50 | 77 | 80 |
|  | 100 | 76 | 79 |
|  | 150 | 74 | 77 |
|  | 200 | 73 | 75 |

What is claim is:

1. A catalyst for removing nitrogen oxides, carbon monoxide and hydrocarbons from an exhaust gas consisting essentially of, as active components, nickel, copper and at least two noble metals selected from iridium, rhodium and ruthenium, supported on a carrier, the atomic weight ratio of copper to nickel being 0.2 to 5 to 1;

the atomic weight ratio of the sum of copper and nickel to the sum of the noble metals being 10 to 100,000 to 1; and the total weight of copper and nickel being 10 to 200 grams per liter of the catalyst, said catalyst being prepared by the steps comprising a. adding a carrier to a mixed aqueous solution of water-soluble salts of copper and nickel;
b. drying the product of step (a);
c. calcining the dried mixture of step (b);
d. immersing the calcined product of step (c) in an aqueous solution of a salt or an acid of at least two metals selected from the group consisting of iridium, rhodium and ruthenium;
e. drying the product of step (d); and
f. reducing the dried product of step (e) in a reducing atmosphere at a temperature of 300° to 600°C.

to thereby obtain the catalytic product.

2. The catalyst of claim 1 wherein
the atomic weight ratio of copper to nickel is 0.3 to 3;
the atomic weight ratio of the sum of copper and nickel to the sum of the noble metal catalysts is 100 to 10,000; and,
the total weight of copper and nickel is 20 to 100 grams per liter of the catalyst.

3. The catalyst of claim 2 which contains, as the noble metals, iridium and ruthenium in an amount of from 0.001 to 1 gram per liter of the catalyst.

4. The catalyst of claim 3 containing from 0.01 to 0.5 gram of iridium and ruthenium per liter of catalyst.

5. The catalyst of claim 1 which contains, as the noble metals, iridium, rhodium and ruthenium.

6. The catalyst of claim 1 which contains, as the noble metals, iridium and rhodium.

7. The catalyst of claim 1 which contains, as the noble metals, ruthenium and rhodium.

8. The catalyst of claim 1 wherein the carrier is selected from the group consisting of alumina, mullite, cordierite, silicon carbide, metallic ribbon and metallic gauze.

9. The catalyst of claim 1 wherein the carrier is alumina.

UNITED STATES PATENT AND TRADEMARK OFFICE
CERTIFICATE OF CORRECTION

PATENT NO. : 3,953,363
DATED : April 27, 1976
INVENTOR(S) : YAMAUCHI, ET AL.

It is certified that error appears in the above-identified patent and that said Letters Patent are hereby corrected as shown below:

Item 73, line 1, delete "Kogaku", insert -- Kagaku --

Signed and Sealed this

Tenth Day of August 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,953,363
DATED : April 27, 1976
INVENTOR(S) : YAMAUCHI, ET AL.

It is certified that error appears in the above-identified patent and that said Letters Patent are hereby corrected as shown below:

Item 73, line 1, delete "Nippen", insert -- Nippon --

Column 3, line 48, delete "EXAMPLE 1", insert -- COMPARATIVE EXAMPLE 1 --

Signed and Sealed this

Thirtieth Day of November 1976

[SEAL]

Attest:

RUTH C. MASON
Attesting Officer

C. MARSHALL DANN
Commissioner of Patents and Trademarks